(12) United States Patent
Zettler

(10) Patent No.: US 7,786,870 B2
(45) Date of Patent: Aug. 31, 2010

(54) TRANSPONDER WITH AN IMPROVED VOLTAGE LIMITER CIRCUIT

(75) Inventor: Werner Zettler, St. Marein Im Muerztal (AT)

(73) Assignee: NXP B.V., Eindhoven (NL)

( * ) Notice: Subject to any disclaimer, the term of this patent is extended or adjusted under 35 U.S.C. 154(b) by 373 days.

(21) Appl. No.: 11/914,742

(22) PCT Filed: May 19, 2006

(86) PCT No.: PCT/IB2006/051591

§ 371 (c)(1),
(2), (4) Date: Nov. 16, 2007

(87) PCT Pub. No.: WO2006/123315

PCT Pub. Date: Nov. 23, 2006

(65) Prior Publication Data

US 2008/0204241 A1 Aug. 28, 2008

(30) Foreign Application Priority Data

May 19, 2005 (EP) .................................. 05104260

(51) Int. Cl.
*G08B 13/14* (2006.01)

(52) U.S. Cl. ............... 340/572.4; 340/572.1; 340/572.7

(58) Field of Classification Search .............. 340/572.1, 340/572.7, 572.8, 539.1, 539.21, 539.23, 340/10.1, 10.2, 572.4; 343/850, 834; 235/451, 235/472.01, 492, 380

See application file for complete search history.

(56) References Cited

U.S. PATENT DOCUMENTS

| 5,945,920 | A | 8/1999 | Maletsky |
| 6,079,622 | A * | 6/2000 | Goto ........................... 235/492 |
| 6,167,236 | A | 12/2000 | Kaiser et al. |
| 6,940,467 | B2 * | 9/2005 | Fischer et al. ............... 343/850 |
| 7,602,274 | B2 * | 10/2009 | Lee et al. .................... 340/10.2 |

FOREIGN PATENT DOCUMENTS

| WO | 9939450 A1 | 8/1999 |
| WO | 03065302 A1 | 8/2003 |

* cited by examiner

*Primary Examiner*—Van T. Trieu

(57) ABSTRACT

A transponder with an antenna and an antenna voltage limiting unit for limiting an antenna voltage to a first voltage limit when the transponder is receiving data and to a second voltage limit when the transponder is sending data. Dynamic voltage limitation may be implemented by using a computer program or implemented in hardware. Additionally, it is possible to introduce a third voltage limit when the transponder is in a third mode of operation such as standby or sleeping mode.

10 Claims, 5 Drawing Sheets

TRANSPONDER WITH AN IMPROVED VOLTAGE LIMITER CIRCUIT

FIELD OF THE INVENTION

The invention relates to a transponder, a method of operating a transponder, and a program element.

BACKGROUND OF THE INVENTION

The importance of automatic identification systems is growing, particularly in the service sector, and in the fields of logistics, commerce and industrial production. Automatic identification systems are thus implemented more and more in these and other fields and will probably substitute barcode systems in the future. Further applications of identification systems relate to the identification of persons and animals. It is also very interesting to have the possibility of monitoring and controlling a cooling history of food, particularly of perishable food, by using an identification system.

In particular, contactless identification systems such as transponder systems are suitable for wireless transmission of data in a fast manner and without cable connections, which may be disturbing. Such systems use the emission and absorption of electromagnetic waves, particularly in the high-frequency domain. A transponder may be realized as an RFID tag ("radio frequency identification tag") or as a smart card.

In a transponder according to the prior art, the coil supply voltage may be limited to a certain value, thus compensating different field strengths between a reader station and the transponder. For proper performance, particularly at a maximum reading distance, this value may be set to a minimum limit at which a demodulator of the transponder starts operating properly.

According to the prior art, contactless RFID tags comprise a coil communicating via an electromagnetic high-frequency field, wherein the coil voltage may be limited to a particular value by a parallel voltage limiter circuit. This voltage limit is used when the RFID tag receives commands or data from a read/write device, and for load modulation, i.e. when the RFID tag transmits data to a read/write device.

An RFID tag 100 according to the prior art will be described hereinafter with reference to FIG. 1.

Strictly speaking, FIG. 1 only shows the front-end circuitry of an RFID tag, wherein other portions of an RFID tag are omitted. However, the term "RFID tag" may hereinafter be used as a short form for "front-end circuitry of an RFID tag". The front-end circuitry is indicated in FIG. 1 by a broken-line box.

The RFID tag 100 comprises an antenna coil 101 adapted to receive electromagnetic waves, particularly in the high-frequency domain, emitted by a read/write device (not shown). When the antenna coil 101 absorbs electromagnetic radiation, a voltage is generated between a first coil connection 111 and a second coil connection 112. Together with a capacitor 113, the antenna coil 101 defines a range of wavelengths of electromagnetic radiation which the RFID tag 100 may absorb.

Four rectifier diodes 102 are provided between the antenna coil 101 and an antenna voltage limiter circuit 104 and are connected to rectify a voltage of the antenna coil 101. Two of the rectifier diodes 102 are connected to a reference or ground potential 103, while the other two rectifier diodes 102 form the supply for the antenna voltage limiter circuit 104.

The rectified voltage is supplied to an input of the regulator unit 105 as the currently prevailing value. The regulator unit 105 receives, as a further input, a constant reference voltage from a reference voltage unit 106 and generates a regulating signal Vreg on the basis of a comparison of the current value and the constant target value provided by the reference voltage unit 106.

This regulating signal Vreg is supplied to a receiving demodulator unit 107 for demodulating a received signal, and is supplied to a gate of a first MOSFET 108. A source of the first MOSFET 108 is connected to the ground potential 103, while a drain of the first MOSFET 108 is connected to the supply of the antenna voltage limiter circuit 104. Both the regulator unit 105 and a drain of a second MOSFET 110 are connected to said supply. A source of the second MOSFET 110 is connected to the ground potential 103. It should be noted that the MOSFETs are presumed to be of the N-channel type. Identifiers change accordingly when P-channel types are used.

Each value of the regulating signal Vreg causes a certain conductance of the first MOSFET 108 which in turn increases or decreases the supply voltage of the antenna voltage limiter circuit 104 and thus the supply voltage of the RFID tag 100 (including said "other portions" of an RFID tag which are omitted in FIG. 1). The higher the conductance, the lower the supply voltage.

The second MOSFET 110 is switched parallel to the first MOSFET 109. A modulator unit 109 is coupled to a gate of the second MOSFET 110 and provides the second MOSFET 110 with control signals to characteristically "short-circuit" the antenna coil 101 in a pulsed manner in order to modulate the antenna coil signal to send data. Variations in the electromagnetic field due to this modulation may be recognized by a read/write device so that the sent data may be retrieved from the modified electromagnetic field.

FIG. 2 is a diagram 200 illustrating an antenna voltage, or, in other words, an envelope 203 of the high-frequency signal. The diagram 200 has an abscissa 201 on which the time t is plotted. A voltage VLA/LB is plotted on an ordinate 202 of the diagram 200, wherein LA and LB denote the first coil connection 111 and the second coil connection 112, respectively. The diagram 200 shows a first portion 204 corresponding to a command-receiving mode, and a second portion 205 corresponding to a back-modulation operation mode.

In the system described with reference to FIGS. 1 and 2, the operation voltage VPEAK1 of the antenna voltage limiter circuit 104 is fixed to a value at which the command-receiving circuit (demodulator 107) starts working even at low electromagnetic field strengths using the voltage-limiting regulating signal Vreg. Since this level is maintained for the response of the RFID tag 100 as well, a relatively small voltage swing occurs at the coil connections during load modulation and thus also at the receiver of the read/write device. This may have the consequence that the recognition of the RFID tag 100 response by the reader is relatively prone to failure.

OBJECT AND SUMMARY OF THE INVENTION

It is an object of the invention to improve the operation of a transponder in an efficient manner.

In order to achieve the object defined above, a transponder, a method of operating a transponder and a program element as defined in the independent claims are provided.

In one embodiment of the invention, the transponder comprises an antenna and an antenna voltage limiter circuit adapted to limit an antenna voltage to a first voltage limit when the transponder is in a first operation mode and to a second voltage limit when the transponder is in a second operation mode, wherein the first operation mode is a mode in which the transponder receives data, and the second operation mode is a mode in which the transponder sends data.

In a further embodiment of the invention, a method of operating a transponder with an antenna comprises the step of limiting an antenna voltage to a first voltage limit when the transponder is in a first operation mode and to a second voltage limit when the transponder is in a second operation mode, wherein the first operation mode is a mode in which the transponder receives data, and the second operation mode is a mode in which the transponder sends data.

In another embodiment of the invention, a program element for operating a transponder with an antenna is provided, which program element, when being executed by a processor, is adapted to control or carry out the above-mentioned method steps.

A dynamic voltage limitation in accordance with an embodiment of the invention can be controlled by a computer program, i.e. by software, or by using one or more special electronic optimization circuits, i.e. in hardware, or in a hybrid form, i.e. by means of software and hardware components.

The characterizing features according to the invention particularly have the advantage that a transponder is provided in which an antenna coil voltage limit value may be dynamically adjusted. In other words, an antenna voltage limitation may be realized to limit the antenna voltage to different voltage limits in different operation modes of the transponder. By selectively and dynamically adapting the maximally allowed voltage value of the antenna coil to a respective current operation mode, it is possible to efficiently and flexibly adjust the voltage limit so that the performance of the transponder in the respective operation mode can be improved or optimized.

In contrast to the prior art, the system according to the invention has the advantage that a comparatively low value or limit which may be used for reading does not have to be used for sending as well. For sending, the voltage limit may be adjusted independently and brought to a, for instance, higher value compared to reading. The transmitting range for load modulation (i.e. sending data back to the reader) is thereby increased.

In any case, this voltage limit should not exceed an upper limit so as to avoid a negative influence on components of the transponder which might be damaged by a high voltage or by heating as a consequence of a high voltage. For instance, components of an integrated circuit which may be part of the transponder can easily be destroyed by large voltages.

Advantageously, the first voltage limit may be lower than the second voltage limit. A larger voltage swing may thus be utilized to allow communication with a read/write device, even when the read/write device is quite far remote from the transponder. By taking these measures, an increased spatial operation range may be obtained, i.e. a maximum distance through which communication between the transponder and the read/write device may be increased, particularly in an operation mode in which the transponder sends data to the read/write station, as a consequence of an increased modulation depth. Furthermore, the signal-to-noise ratio may be increased as well.

The antenna voltage limiter circuit may be adapted to continuously change the antenna voltage between the first voltage limit and the second voltage limit when the transponder changes between the first operation mode and the second operation mode. By continuously altering the voltage limit, a smooth transition may be achieved which may prevent the operation of the transponder from being disturbed by an abrupt transition. Particularly when the operation mode is changed from a receiving mode to a sending mode, the voltage may be continuously increased, and the voltage limit may be smoothly decreased at a transition from a sending mode to a receiving mode.

The antenna voltage limiter circuit may be adapted to limit the antenna voltage to a third voltage limit when the transponder is in a third operation mode. In other words, it is possible that the antenna voltage limiter circuit does not only distinguish between two operation modes, but may also be capable of distinguishing between three or more operation modes. Such a third operation mode may be, for instance, a low-energy consumption standby mode of the transponder. In such a standby or sleeping mode, the antenna voltage may be limited to another appropriate value, for instance, a relatively low value so as to save energy.

The transponder may comprise a rectifier unit connected between the antenna voltage limiter circuit and the antenna and adapted to rectify the antenna voltage. When the antenna coil receives electromagnetic radiation, this may result in an alternating voltage. By guiding such an alternating electric signal through the rectifier unit which may be, for instance, realized as a diode circuit, the alternating voltage may be rectified to form a direct voltage. Such a direct voltage may be needed as a voltage supply for electric components of the transponder.

The antenna voltage limiter circuit may be adapted to limit the antenna voltage to the first voltage limit or to the second voltage limit as a variable operation mode-dependent target value by comparing the operation mode-dependent target value with a current antenna voltage. In accordance with this embodiment, the target value of the voltage limit, which may be defined by the antenna voltage limiter circuit, is not fixed to a constant value, but may be varied, for instance, in accordance with a change of the operation mode. Such a variable operation mode-dependent target value in accordance with a current operation mode of the transponder may be used as a reference voltage with which the current value of the antenna voltage may be compared. Such a comparison can be carried out, for instance, by using a differential stage. The output of such a differential stage may then be used for generating a regulating signal for regulating the antenna voltage to a desired value in accordance with the operation mode-dependent target value.

Particularly, the antenna voltage limiter circuit may be adapted to generate the operation mode-dependent target value, using a voltage divider. The current voltage of the antenna coil may be supplied to an input of the voltage divider. The voltage divider may be realized as a voltage divider with switchable tapping, i.e. a control signal applied to the voltage divider may control the manner in which a voltage is divided by the voltage divider. For instance, a modulator unit of the transponder may go into a sending operation mode and may initiate a control signal for controlling the voltage divider to divide the voltage in accordance with the new operation mode.

The transponder may comprise a modulator unit adapted to modulate the antenna voltage for sending data and adapted to generate a control signal providable to the antenna voltage limiter circuit as a basis for the operation mode-dependent target value. In other words, when such a modulator unit modulates the antenna voltage to encode signals to be transmitted in accordance with this modulation, the modulator does not only supply these modulation signals to the antenna coil, but may additionally send a corresponding control signal to the voltage divider to instruct the voltage divider that the operation mode is now switched to a sending mode. Accordingly, the voltage divider may initiate an adjustment of the variable target value in accordance with this sending operation mode.

The transponder may be realized, for instance, as a radio frequency identification tag or as a smart card.

An RFID tag may comprise a semiconductor chip (having an integrated circuit) in which data may be programmed and rewritten, and a high-frequency antenna matched to an operation frequency band used (for instance, 13.56 MHz, or a frequency band of 902 MHz to 928 MHz in the United States, a frequency band of 863 MHz to 868 MHz in Europe, or other ISM-bands ("industrial scientific medical"), for instance, 2.4 GHz to 2.83 GHz). Besides the RFID tag, an RFID-system may comprise a read/write device and a system antenna enabling bi-directional wireless data communication between the RFID tag and the read/write device. Additionally, an input/output device (e.g. a computer) may be used to control the read/write device. Different types of RFID-systems are distinguished, namely active RFID-systems (having their own power supply device included, for instance, a battery) and passive RFID-systems (in which the power supply is realized on the basis of electromagnetic waves absorbed by a coil and an antenna, respectively, wherein a resulting alternating current in the antenna may be rectified by a rectifying sub-circuit included in the RFID-system to generate a direct current). Moreover, semi-active (semi-passive) systems which are passively activated and in which a battery is used on demand (e.g. for transmitting data) are available.

A smart card or chip card may be a tiny secure cryptoprocessor embedded in a card having the shape of a credit card or in an even smaller card, such as a GSM card. A smart card does not usually contain a battery, but power is supplied by a card reader/writer, i.e. by a read and/or write device for controlling the functionality of the smart card by reading or writing data from or on this card. A smart card device is commonly used in the areas of finance, security access and transportation. Smart cards may contain high-security processors that function as a secure storage means of data such as cardholder data (for instance, name, account numbers, number of collected loyalty points). Access to these data may only be made possible when the card is inserted into a read/write terminal.

The transponder may be designed for communication with a read/write device according to ISO 15693 or ISO 14443. This standard defines a communication protocol for wireless communication between the transponder and a control apparatus allowing reading and/or writing data from or on the transponder. ISO 15693 systems may operate at 13.56 MHz frequency and may offer a maximum read distance of 1 m to 1.5 m and more. ISO 14443 defines identification cards with an embedded chip (proximity card) and a magnetic loop antenna that may operate at 13.56 MHz (RFID).

These and further aspects of the invention are apparent from and will be elucidated with reference to the embodiments described hereinafter.

DESCRIPTION OF EMBODIMENTS

Figure 1:
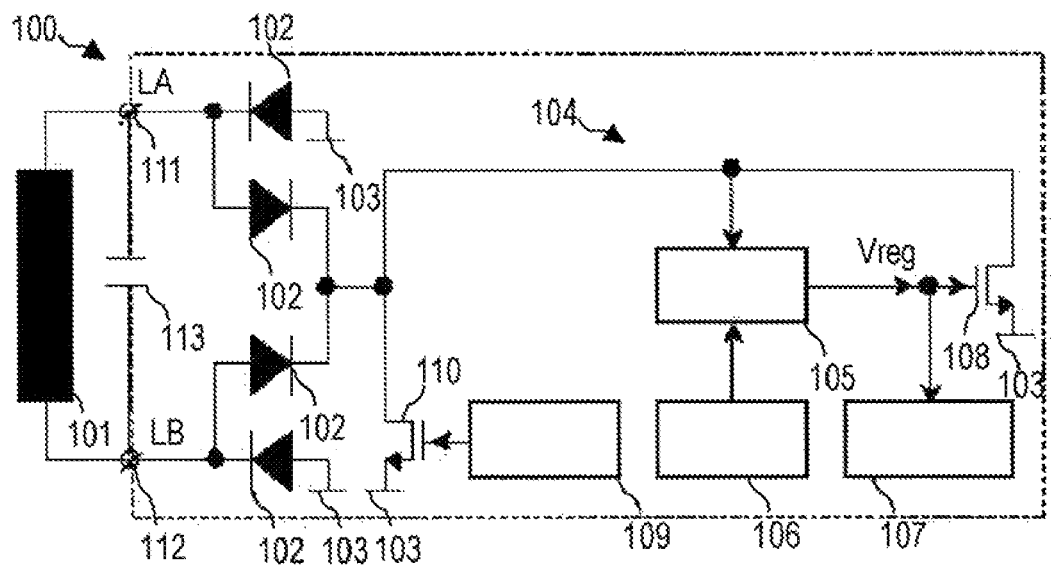
FIG. 1 shows an RFID tag according to the prior art.
Figure 2:
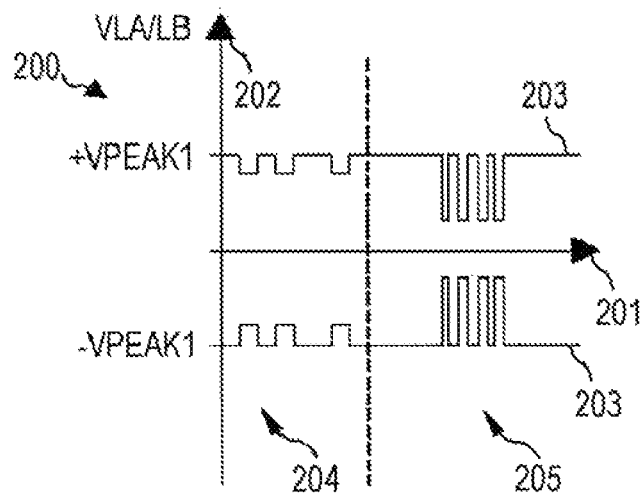
FIG. 2 is a diagram illustrating different operation modes of the RFID tag of FIG. 1.

The illustrations in the drawings are schematic. In these drawings, similar or identical elements are denoted by the same reference signs.

A transponder system 300 in accordance with an embodiment of the invention will now be described with reference to FIG. 3. The transponder system 300 comprises a transponder 301 and a read/write device 302. The transponder 301 and the read/write device 302 are communicatively coupled in a wireless manner. In other words, communication between the transponder 301 and the read/write device 302 is based on the transmission of electromagnetic radiation in the high-frequency or radio-frequency domain.

The read/write device 302 is adapted to emit electromagnetic radiation in the high-frequency domain, using a transmitter/receiver coil 306. Furthermore, the transmitter/receiver coil 306 of the read/write device 302 is adapted to receive or detect electromagnetic radiation. When the transponder 301 absorbs energy from such an electromagnetic field or modifies this electromagnetic field in a characteristic manner, the transmitter/receiver coil 306 may detect such an event. Such a modification, performed by the transponder 301, of the properties of the electromagnetic field generated by the transmitter/receiver coil 306 may be indicative of data or may encode data to be sent from the transponder 301 to the read/write device 302.

The read/write device 302 further comprises a control unit 305 which controls the transmitter/receiver coil 306 and is capable of sending data to the transponder 301 or of retrieving data sent from the transponder 301. The transponder 301 comprises an antenna coil 308 which is capable of receiving and/or emitting electromagnetic radiation in the high-frequency range. Particularly, the antenna coil 308 is capable of receiving electromagnetic radiation emitted by the transmitter/receiver coil 306 of the read/write device 302. The antenna coil 308 may be realized as a conventional coil or inductor. It may also be realized as an integrated circuit element.

Furthermore, the transponder 301 comprises an antenna voltage limiter circuit 303 which is adapted to limit an antenna voltage of the antenna coil 308 to a first voltage limit when the transponder 301 receives data encoded in electromagnetic radiation signals from the transmitter/receiver coil 306. The antenna voltage limiter circuit 303 is further adapted to limit the antenna voltage of the antenna coil 308 to a second voltage limit, which is larger than the first voltage limit, when the transponder 301 is in an operation mode in which it sends data to the read/write device 302.

"Sending" data from the transponder 301 to the read/write device 302 does not necessarily mean that electromagnetic radiation is actively emitted by the antenna coil 308 and is transmitted to the read/write device 302, wherein the sent data are encoded in the electromagnetic radiation. In contrast to this, the transponder 301 may characteristically modify a manner in accordance with which the antenna coil 308 extracts or consumes electromagnetic field energy of electromagnetic waves emitted by the transmitter/receiver coil 306 of the read/write device 302. Since such a modification can be detected as a change of properties of the electromagnetic field, the transmitter/receiver coil 306 may derive the data from this modification.

Figure 3:
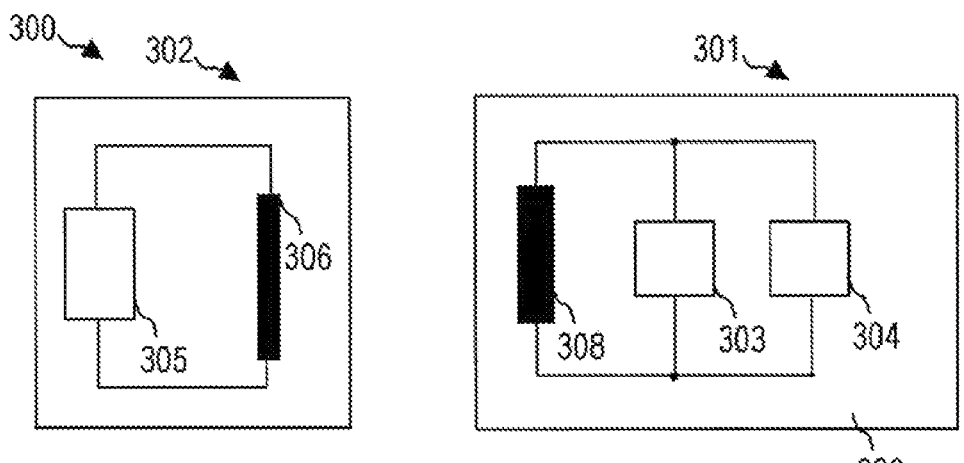
FIG. 3 shows a transponder system in accordance with an embodiment of the invention.

As can be further seen in FIG. 3, the antenna coil 308 is not only coupled to the antenna voltage limiter circuit 303, but also to a data-processing unit 304. The data-processing unit 304 is capable of determining data sent from received electromagnetic radiation. The data-processing unit 304 is further capable of controlling the modulation of the electromagnetic field so as to encode data to be sent to the read/write device 302. Electromagnetic radiation may comprise information, for instance, control information, from the read/write device 302. The data-processing unit 304 may be adapted to process such commands or requests, and generate signals which must be sent back to the read/write device 302 as a response to the request or command.

The components 303, 304, 308 may be provided on and/or in a plastic substrate 309. Any one of the components 303, 304 can be further realized as an integrated circuit. Such an integrated circuit may be realized as a semiconductor chip, for instance, manufactured in silicon technology or based on III-V-semiconductors. A silicon chip is an electronic chip made from a silicon wafer and has a monolithically integrated circuit implemented therein. Alternatively, any one of the components 303, 304 may be realized on the basis of electronic members which are interconnected or wired. Alternatively, the functionality of any one of the components 303, 304 can be realized by using one or more software components in addition to appropriate hardware components.

Figure 4:
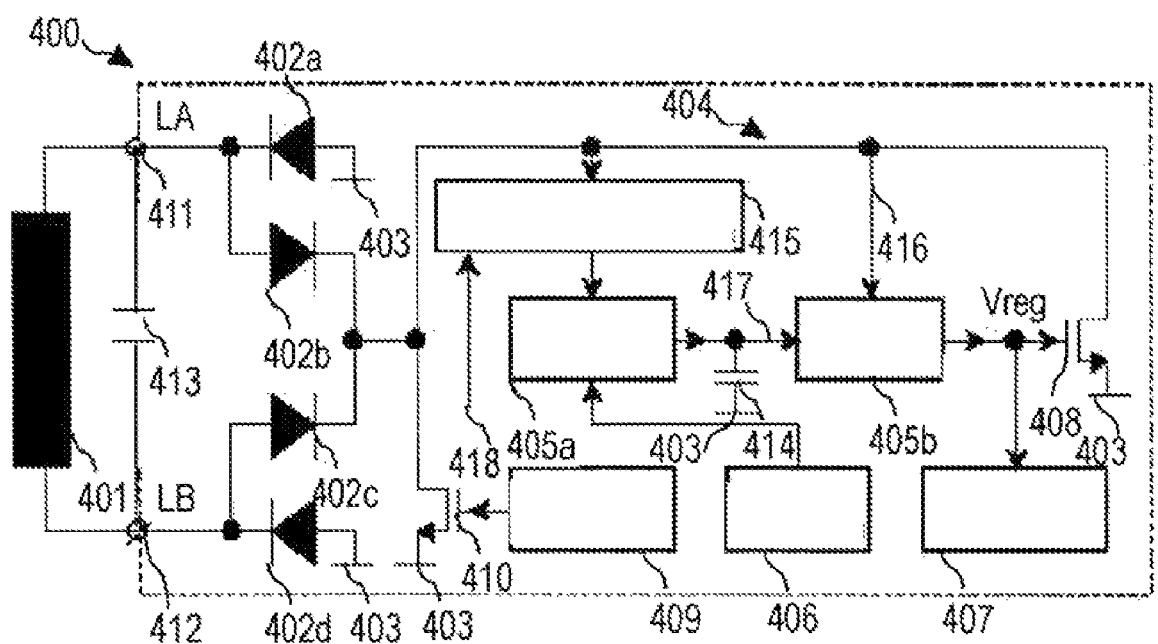
FIG. 4 shows an RFID tag in accordance with an embodiment of the invention.
Figure 7:
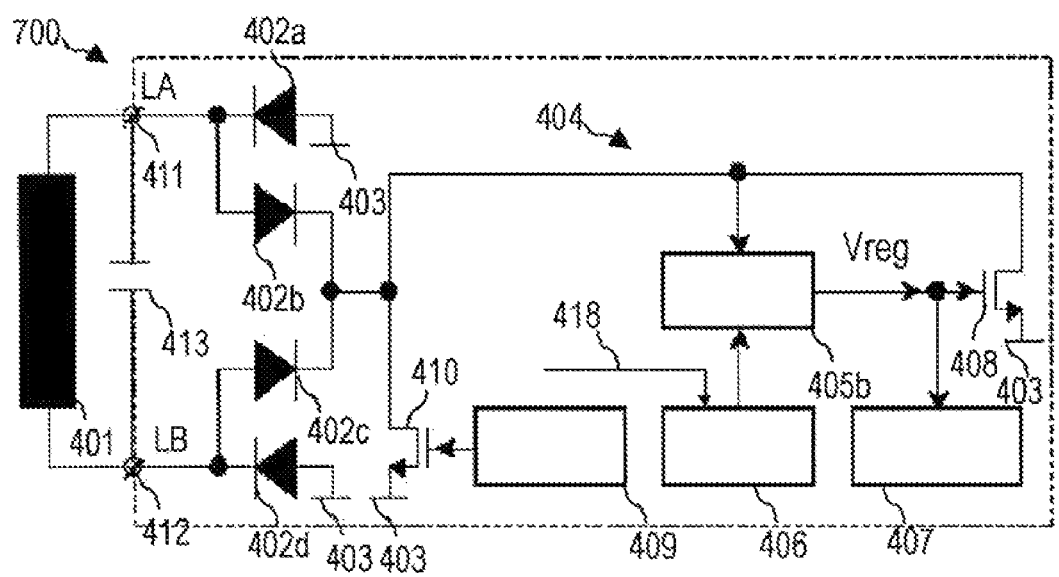
FIG. 7 shows an RFID tag in accordance with another embodiment of the invention.
Figure 8:
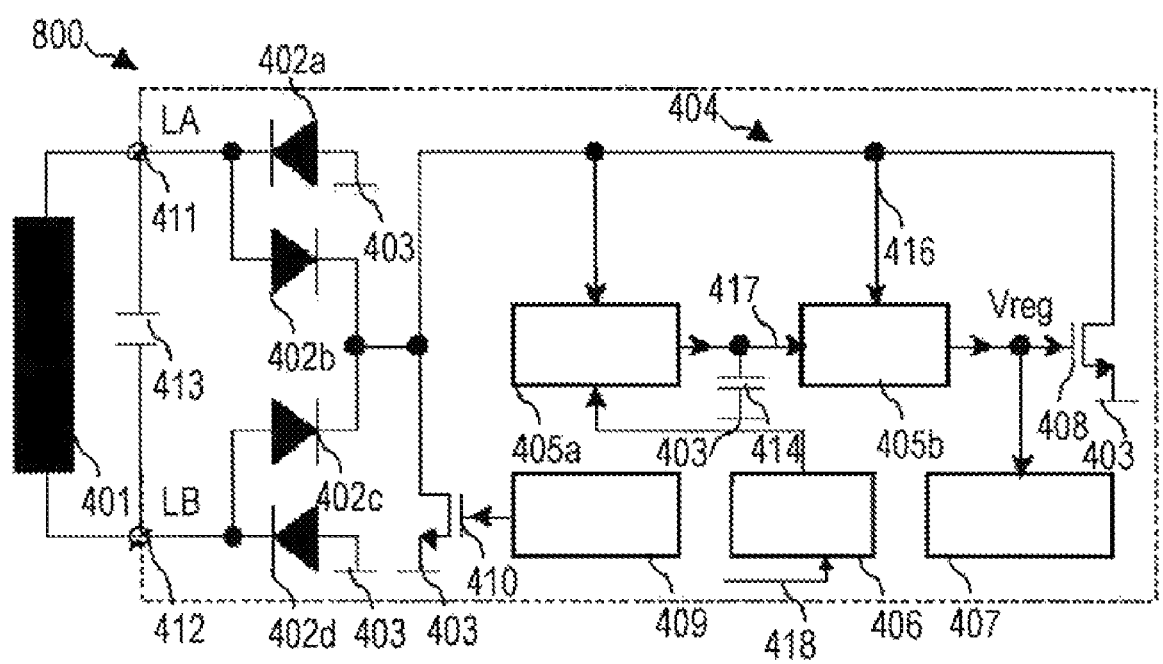
FIG. 8 shows an RFID tag in accordance with another embodiment of the invention.

An RFID tag 400 in accordance with an embodiment of the invention will now be described with reference to FIG. 4. Strictly speaking, FIG. 4 as well as FIGS. 7 and 8 only show a front-end circuitry of an RFID tag, whereas other portions of an RFID tag which are not important for the described embodiments of the invention are omitted. However, the term "RFID tag" may hereinafter be used as a short form for "front-end circuitry of an RFID tag". The front-end circuitry is indicated in FIG. 4, FIGS. 7 and 8 by a box in broken lines.

The RFID tag 400 comprises an antenna coil 401 for receiving electromagnetic radiation in the high-frequency range, particularly adapted to absorb electromagnetic radiation at a frequency of 13.56 MHz. Parallel to the antenna coil 401, a first capacitor 413 is connected, wherein the value of the inductance L of the antenna coil 401 and the value of the capacity C of the first capacitor 413 may be adjusted in such a way that the RFID tag 400 is in resonance at a particular carrier frequency of, for instance, 13.56 MHz.

A rectifying sub-circuit is formed by a first rectifier diode 402a, a second rectifier diode 402b, a third rectifier diode 402c and a fourth rectifier diode 402d. The rectifier diodes 402a to 402d are connected between the arrangement of the antenna coil 401 and the first capacitor 413, on the one hand, and an antenna voltage limiter circuit 404, on the other hand. The first rectifier diode 402a is connected between a first coil connection 411 (also denoted by LA) and ground potential 403. The second rectifier diode 402b is connected between the first coil connection 411 and the supply of the antenna voltage limiter circuit 404. The third rectifier diode 402c is connected between the second coil connection 412 (also denoted by LB) and the supply of the antenna voltage limiter circuit 404. The fourth rectifier diode 402d is connected between the second coil connection 412 and ground potential 403. The rectifier diodes 402a to 402d may be realized as MOSFETs which are connected or operated in a diode mode. The rectifier diodes 402a and 402d may also be realized as MOSFET switches.

The structure of the antenna voltage limiter circuit 404 will now be described in more detail. A voltage divider 415 is provided which has a switchable tapping, i.e. a voltage dividing function which may be switched. The rectified voltage, which is currently present at the antenna coil 401, is supplied to an input of the voltage divider 415 and to a fast regulator unit 405b. In other words, a current voltage value 416 is supplied to an input of the fast regulator 405b.

An output of the voltage divider 415 is coupled to an input of a slow regulator unit 405a. The output of the slow regulator unit 405a receives a variable target voltage value signal 417 which has been generated by the slow regulator 405a. A reference voltage unit 406 is coupled to an input of the slow regulator unit 405a and supplies a reference voltage.

Figure 5:
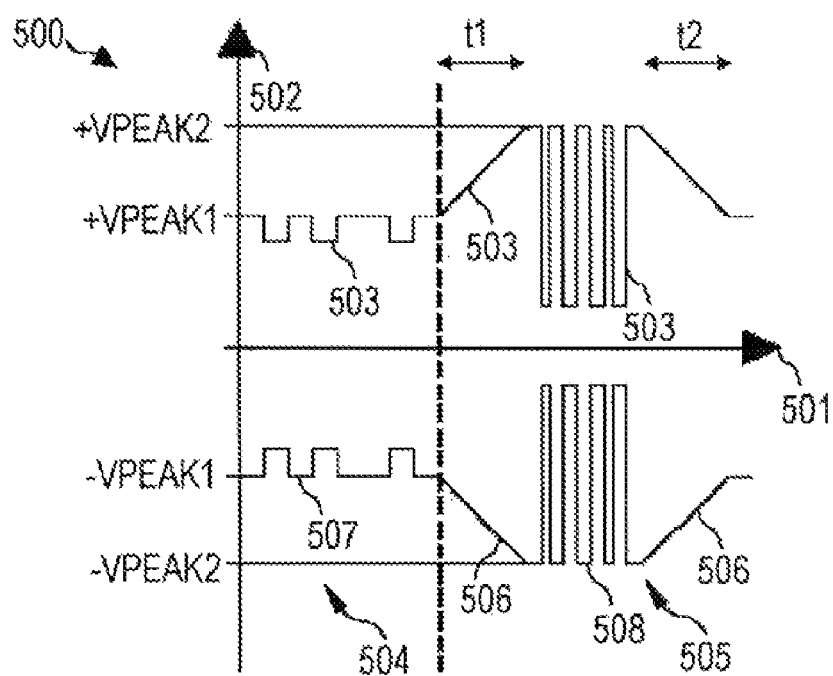
FIG. 5 is a diagram illustrating different operation modes of the RFID tag of FIG. 4.

A second capacitor 414 is connected between the ground potential 403 and the output of the slow regulator 405a so as to provide a slope between two different voltage limits (see also VPEAK1 and VPEAK2 in FIG. 5). Assuming that the output of the slow regulator unit 405a may only draw a certain current, any step of said output leads to a ramp of the input voltage for the fast regulator 405b.

The variable target voltage value 417 supplied at an output of the slow regulator 405a is now supplied at an input of the fast regulator unit 405b. Based on the variable target voltage value 417 and the current voltage value 416, or, in more detail, based on a comparison of these two signals, the fast regulator unit 405b generates a regulating signal Vreg at its output. This signal may be applied to a receiving demodulator unit 407 which is capable of retrieving data transmitted from a read/write device (not shown) to the RFID tag 400, in other words, capable of decoding the signal transmitted to the RFID tag 400.

Furthermore, the regulating signal Vreg is supplied at a gate of a first MOSFET 408. A source of the first MOSFET 408 is connected to the ground potential 403, whereas its drain is connected to the supply of the antenna voltage limiter circuit 404. Both the input of the voltage divider 415 and the input of the second regulator 405b are connected to said supply.

Each value of the regulating signal Vreg causes a certain conductance of the first MOSFET 408 which in turn increases or decreases the supply voltage of the antenna voltage limiter circuit 404 and thus the supply voltage of the RFID tag 400. The higher the conductance, the lower the supply voltage. Furthermore, a second MOSFET 410 is switched parallel to the first MOSFET 409 for modulating the elecromagnetic field.

To this end, a modulator unit 409 is provided, which is capable of load-modulating a signal present at the antenna coil 401 in order to send a signal back to the read/write device (not shown). For this purpose, the modulator unit 409 is coupled to a gate of a second MOSFET 410. A source of the second MOSFET 410 is coupled to the ground potential 403. A drain of the second MOSFET 410 is coupled to the supply of the antenna voltage limiter circuit 404. It should be noted that the MOSFETs 408, 410 are assumed to be of the N-channel type. Identifiers change accordingly when using P-channel types. Furthermore, it should be noted that the transistors, which are used in an inventive RFID tag 400, do not necessarily have to be of the MOSFET type. In principle, any type of transistor is feasible but the MOSFET type is favorable for integrated circuitry.

When switching to a back-modulation or sending operation state as indicated by an arrow 418, a signal indicative of this switching can be applied to the voltage divider 415 (for instance, by the modulator unit 409) to inform the voltage divider 415 that the operation state now changes and that it might be appropriate to adjust the voltage limit which is maximally allowed for the antenna coil 401. In response to such a signal, the voltage divider 415 applies a correspondingly modified signal to the slow regulator unit 405a so that a modified variable target voltage value 417 is provided. As a consequence, the regulating signal Vreg is modified accordingly, and the voltage limit for the sending mode may be increased as compared with the voltage limit for the previous receiving mode.

The RFID tag 400 may be adapted for communication with a read/write device in accordance with a communication protocol as defined in ISO 15693. Although not shown in FIG. 4, a security feature can be realized in the RFID tag 400 so that, for instance, a user requires a password to control the RFID tag 400 or data stored therein. In other words, an authorization may be required for controlling or accessing the RFID tag. At a frequency of 13.56 MHz, the RFID tag 400 may further have a communication range with a read/write device of 70 cm to 80 cm and more. A field strength range H may be between 40 mA/m and 12 A/m.

The voltage limitation realized by the antenna voltage limiter circuit 404 will now be explained in more detail. Such a limitation of the voltage may be desired particularly for two reasons. On the one hand, it should be avoided that the RFID tag 400 or components thereof are heated to high temperatures which might destroy the RFID tag 400. On the other hand, the voltage should be reduced in order to prevent components of the integrated circuit shown in FIG. 4 from being destroyed by too high electric voltage values.

A diagram 500 as shown in FIG. 5 will now be described to explain details related to the dynamic adjustment of voltage limits for the RFID tag 400. The diagram 500 shows an abscissa 501 on which the time t is plotted. An envelope 503 of the high-frequency signal (i.e. a voltage VLA/LB) is plotted on an ordinate 502. FIG. 5 shows two different operation states relating to a first portion 504 and a second portion 505 of the diagram 500.

The first portion 504 relates to an operation state in which the RFID tag 400 receives electromagnetic waves including data from a read/write device. In this command-receiving mode, the voltage of the antenna coil 401 is limited to a relatively low voltage limit value of VPEAK1.

In contrast to this, in a second operation mode relating to the second portion 505, the RFID tag 400 is in a sending mode, i.e. it sends data to the read/write device by load modulation. The dips shown in the second portion 505 of FIG. 5 symbolize information to be transmitted, included in the modulation pattern. In this sending mode, the voltage of the antenna coil 401 is limited to a relatively high voltage limit value of VPEAK2.

FIG. 5 further shows a slope 506, i.e. a smooth transition from the operation mode in accordance with first portion 504 to the operation mode in accordance with the second portion 505. A slope portion designated t1 indicates that the time for this raising slope may be, for instance, 100 μs. However, for the transition from the operation mode relating to the second portion 505 back to an operation mode relating to the first portion 504, the slope designated t2 may relate to 300 μs.

In order to obtain an optimized high voltage swing during back-modulation (i.e. in a direction towards the read/write device), the threshold of the coil voltage limit is regulated, before starting the data back-modulation, and continuously increases (at a sufficiently slow increasing rate) from the low value VPEAK1 to a higher value VPEAK2. VPEAK2 may be a value which is maximally allowed in the frame of a particular technology (for instance, twice VPEAK1). During the back-modulation mode, the voltage limit may remain essentially constant at VPEAK2. Afterwards, i.e. going back to the receiving mode, the threshold for the coil voltage limit can be continuously decreased or reduced to the normal level (namely VPEAK1, which might be optimized for the receiving operation mode).

Thus, during back-modulation, already at weak (but particularly at middle) high-frequency field strengths (for instance, when the RFID tag 400 is still relatively far remote from the antenna of the read/write device), the maximally possible coil voltage swing (in dependence on the offered high-frequency energy) can be utilized (i.e. particularly when the receiver of the read/write device needs a very strong back-modulation signal in order to achieve a sufficiently large signal-to-noise ratio).

The RFID tag 400 has been described on the basis of the functional or block-like configuration of FIG. 4. Several practical realizations of each block are possible. However, one particular example of realizing the RFID tag 400 will be given hereinafter. A first part 600 and a second part 650 of a detailed circuit diagram realizing the block architecture as shown in FIG. 4 will now be described in more detail with reference to FIGS. 6A and 6B.

Figure 6A:
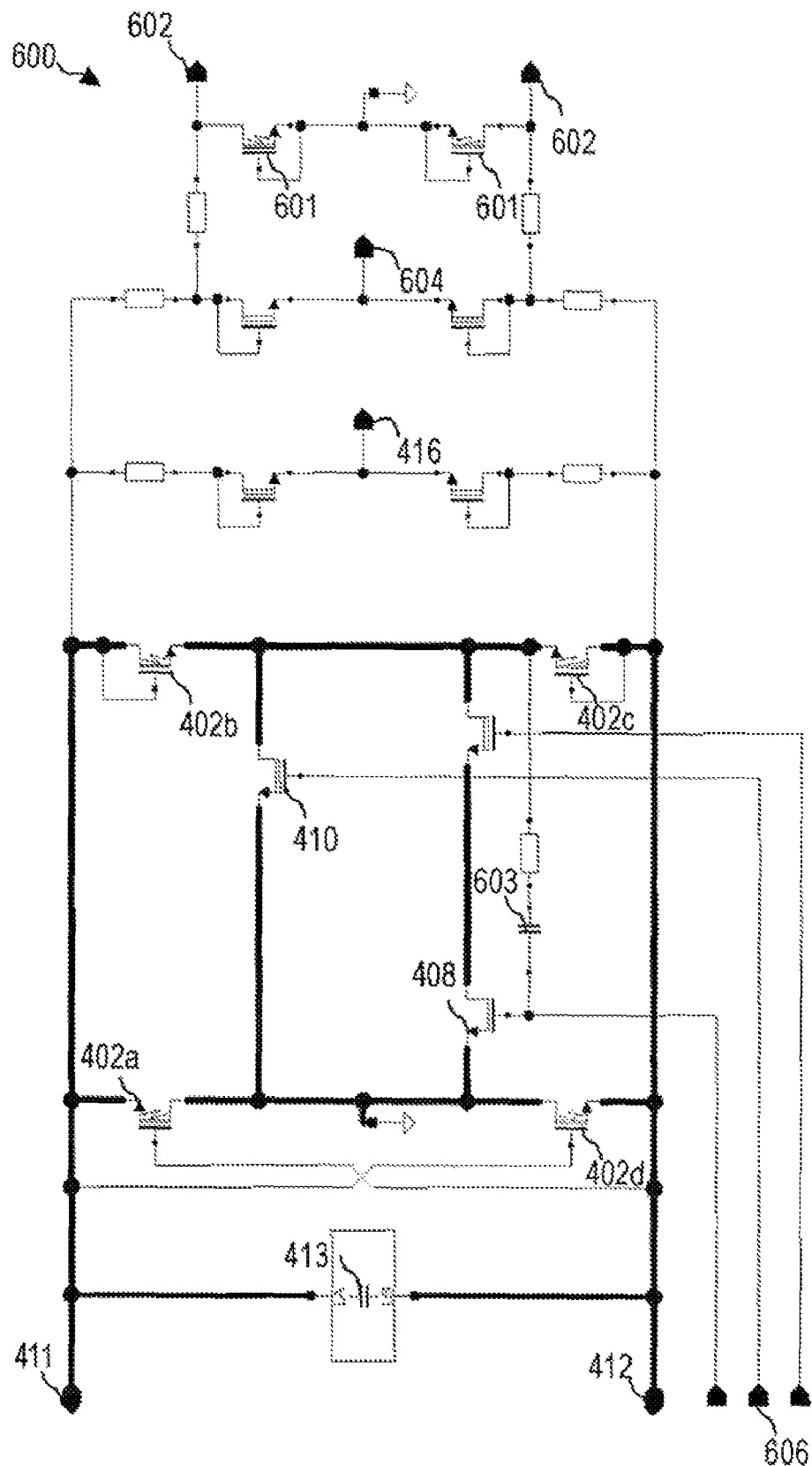
FIG. 6A shows a first part of a circuit diagram as an example for realizing the RFID tag of FIG. 4.

FIG. 6A shows clock recovery connections 602 for recovering a system clock. Moreover, protection devices 601 are shown which may protect the circuit connected to the clock recovery connections 602 against large ESD voltages. Furthermore, a frequency response compensation capacitor 603 is shown. Reference numeral 604 denotes a supply voltage for the remaining RFID tag circuitry.

Figure 6B:
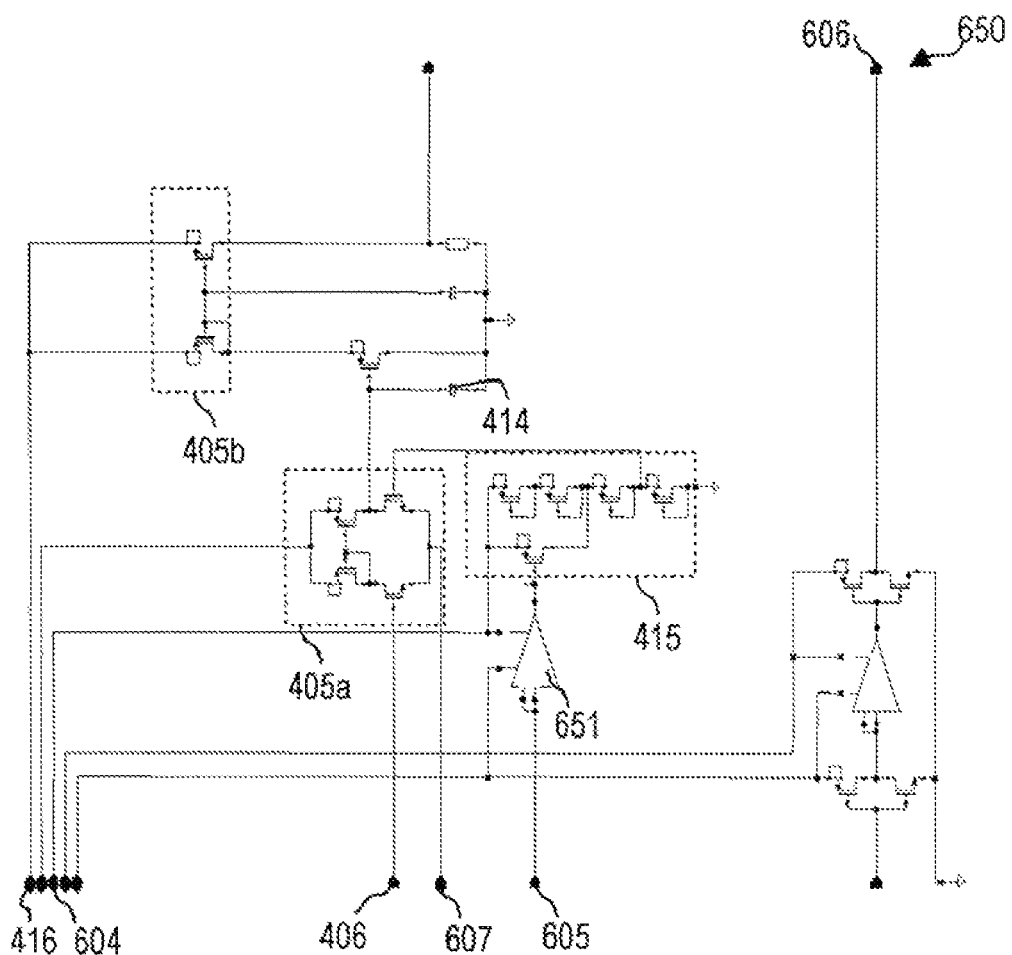
FIG. 6B shows a second part of a circuit diagram as an example for realizing the RFID tag of FIG. 4.

FIG. 6B shows a level shifter 651 which is arranged between a connection 605 and the voltage divider 415. A signal for switching 418 may be supplied at a connection 605. Furthermore, a current signal supplied at a connection 607 in combination with the value of the second capacitor 414 may support a smooth rise or fall of the voltage limit when changing an operation mode. Finally, a signal is supplied at a connection 606 for controlling the second MOSFET 410 in order to load-modulate the electromagnetic field.

Although the realization of the antenna voltage limitation has been described with reference to FIGS. 4, 5, 6A and 6B for a particular circuit, many alternatives for realizing the dynamic adjustment of the voltage limit are possible.

An RFID tag 700 in accordance with an embodiment of the invention will now be described with reference to FIG. 7. The RFID tag 700 is an example of an alternative realization of the dynamic adjustment of the voltage limit In the case of the RFID tag 700, the reference voltage unit 406 receives the control signal 418. In contrast to FIG. 1, the reference voltage unit 406 is adapted to provide different values of a reference voltage depending on the operation state that is to be currently performed, which may be derived from signal 418. This embodiment has a configuration similar to that shown in FIG. 1, to which explicit reference is made. However, in contrast to FIG. 1, the target value provided by the reference voltage unit 406 is not constant, but variable, and this variation may be controlled by the signal 418. The reference voltage unit 406 may be adapted to provide a first value of a reference voltage when the RFID tag 700 is operated in a receiving mode, and to provide a second value of a reference voltage when the RFID tag 700 is operated in a sending mode. A current mode or change of mode can be indicated by the signal 418.

The embodiment of FIG. 7 comprises only a fast regulator 405b, whereas no slow regulator 405a (as in FIG. 4) is provided. Consequently, there may be a relatively abrupt transition of the antenna voltage. However, a corresponding read/write device may be adapted in such a manner that a disturbing signal which may result from an abrupt change of the coil voltage is ignored or suppressed by the read/write device.

In a particular embodiment of the invention, the coil voltage can be directly tapped, and it may be toggled between two reference voltages. In this case, a switchable voltage divider may be omitted.

An RFID tag 800 in accordance with an embodiment of the invention will now be described with reference to FIG. 8. The RFID tag 800 is another example of an alternative realization of the dynamic adjustment of the voltage limit.

The RFID tag 800 differs from the RFID tag 400 particularly in two aspects. First, the switchable voltage divider 415 can be dispensed with and is thus omitted. Secondly, the control signal 418 is supplied to the reference voltage unit 406 which, based on the current operation mode of the RFID tag 800, provides the slow regulator unit 405a with different values of the reference voltage, for instance, a low value in a receiving mode and a high value in a sending mode.

It should be noted that use of the verb "comprise" and its conjugations does not exclude elements or steps other than those stated in the claims, and use of the indefinite article "a" or "an" does not exclude a plurality of elements or steps. Also elements described in association with different embodiments may be combined.

It should also be noted that any reference sign placed between parentheses shall not be construed as limiting the scope of the claims.

The invention claimed is:

1. A transponder, comprising
   an antenna and
   an antenna voltage limiting unit adapted for limiting an antenna voltage to a first voltage limit when the transponder is in a first operation mode and to a second voltage limit when the transponder is in a second operation mode, wherein the first operation mode is an operation mode in which the transponder receives data, and wherein the second operation mode is an operation mode in which the transponder sends data.

2. The transponder according to claim 1, wherein the first voltage limit is lower than the second voltage limit.

3. The transponder according to claim 1, wherein the antenna voltage limiting unit is adapted for continuously changing the antenna voltage between the first voltage limit and the second voltage limit when the transponder changes between the first operation mode and the second operation mode.

4. The transponder according to claim 1, wherein the antenna voltage limiting unit is adapted for limiting the antenna voltage to a third voltage limit when the transponder is in a third operation mode.

5. The transponder according to claim 1, wherein the antenna voltage limiting unit is adapted to limit the antenna voltage to the first voltage limit or to the second voltage limit defined by a variable operation mode dependent target value by comparing the operation mode dependent target value with a current antenna voltage.

6. The transponder according to claim 5, wherein the antenna voltage limiting unit is adapted to generate the operation mode dependent target value using a voltage divider with switchable tapping.

7. The transponder according to claim 5, comprising a modulator unit adapted to modulate the antenna voltage for sending data and adapted to generate a control signal providable to the antenna voltage limiting unit as a basis for the operation mode dependent target value.

8. The transponder according to claim 1, being designed for a communication with a read/write device according to ISO 15693 or ISO 14443.

9. A method of operating a transponder comprising an antenna, wherein the method comprises the step of limiting an antenna voltage to a first voltage when the transponder is in a first operation mode and to a second voltage limit when the transponder is in a second operation mode, wherein the first operation mode is an operation mode in which the transponder receives data, and wherein the second operation mode is an operation mode in which the transponder sends data.

10. A program element of operating a transponder comprising an antenna, which program element, when being executed by a processing unit, is adapted to control or carry out the method step of limiting an antenna voltage to a first voltage limit when the transponder is in a first operation mode and to a second voltage limit when the transponder is in a second operation mode, wherein the first operation mode is an operation mode in which the transponder receives data, and wherein the second operation mode is an operation mode in which the transponder sends data.

* * * * *